United States Patent
Williams et al.

(10) Patent No.: US 8,634,523 B2
(45) Date of Patent: Jan. 21, 2014

(54) TELEPHONIC INFORMATION DISTRIBUTION SYSTEM AND METHOD

(75) Inventors: David Lothele Williams, Menlo Park, CA (US); Rohan Koduvayur Krishnan Chandran, Sunnyvale, CA (US); Kelvin Voon-Kit Chong, Mountain View, CA (US); Srinivas A. Mandyam, San Jose, CA (US); Krishna Vedati, Los Altos, CA (US)

(73) Assignee: YellowPages.com, LLC, Glendale, CA (US)

( * ) Notice: Subject to any disclaimer, the term of this patent is extended or adjusted under 35 U.S.C. 154(b) by 140 days.

(21) Appl. No.: 13/311,505

(22) Filed: Dec. 5, 2011

(65) Prior Publication Data

US 2013/0142320 A1 Jun. 6, 2013

(51) Int. Cl.
*H04M 11/00* (2006.01)

(52) U.S. Cl.
USPC ................ 379/93.25; 379/93.17; 379/93.12; 379/90.01

(58) Field of Classification Search
USPC ............... 379/93.25, 93.12, 90.01, 93.17
See application file for complete search history.

(56) References Cited

U.S. PATENT DOCUMENTS

| | | | |
|---|---|---|---|
| 2008/0139223 A1* | 6/2008 | Stone ..................... | 455/456.3 |
| 2009/0110162 A1* | 4/2009 | Chatterjee ................ | 379/93.23 |
| 2009/0325545 A1* | 12/2009 | Hawkins ................. | 455/414.1 |
| 2010/0158223 A1* | 6/2010 | Fang et al. ............... | 379/93.25 |
| 2011/0206193 A1* | 8/2011 | Cooper .................... | 379/93.09 |
| 2013/0156173 A1* | 6/2013 | Gilbert et al. ............ | 379/93.01 |

* cited by examiner

*Primary Examiner* — Stella Woo
(74) *Attorney, Agent, or Firm* — Kilpatrick Townsend & Stockton LLP

(57) ABSTRACT

A system and method for implementing and managing an information distribution system through a telephonic system. In one embodiment, information related to a callee merchant is dynamically transmitted to users of Internet connectivity capable communication devices.

20 Claims, 2 Drawing Sheets

TELEPHONIC INFORMATION DISTRIBUTION SYSTEM AND METHOD

FIELD

The present application relates to implementing and managing a telephonic information distribution system and method.

BACKGROUND

It is known in the art to provide information to users making calls to merchants before, during, or after such call is made. Existing systems use existing time periods used in actually making or signaling the making, of or the ability to make a connection between the caller and the called party. So-called dial tones, ring tones, call tones and busy tones have been converted in these systems to information, similar to caller identification ("ID") and reverse caller ID or the like.

DETAILED DESCRIPTION

Figure 1:
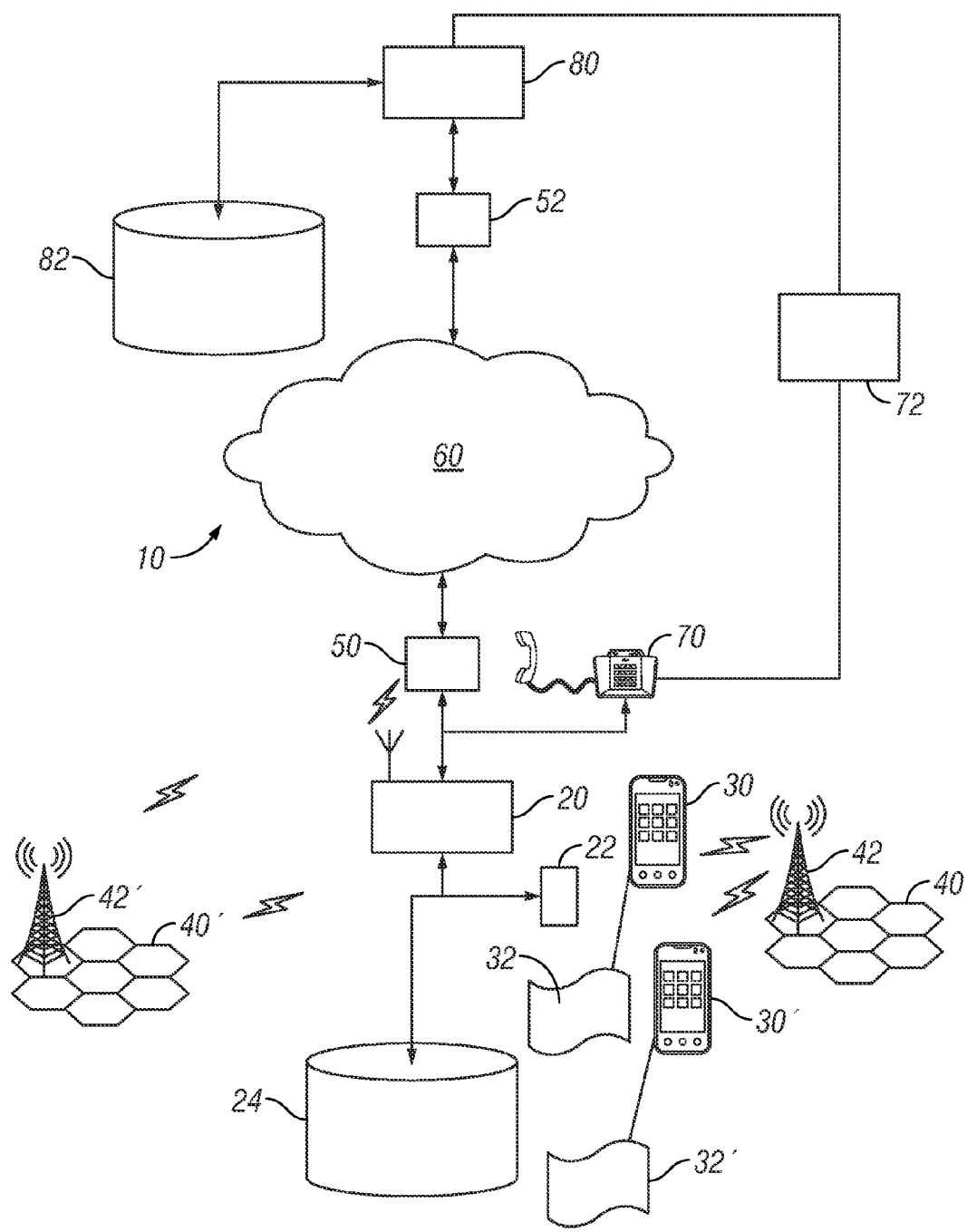
FIG. 1 shows in schematic and partly block diagram form a telecommunications system useful in performing a method according to aspects of embodiments of the disclosed subject matter.

The present disclosure describes aspects of embodiments of a system and method for implementing and managing an information distribution system through a telephonic system. Unlike earlier systems limited to audio communication of the information to the caller and/or the callee, the disclosed subject matter can dynamically select both audio and video information and transmit it to users of Internet connectivity capable communication devices. The information can be selected to be targeted to the particular call and the particular caller and/or callee (merchant) at the time of the call being made.

A telecommunications carrier as used in the present application is generally what is considered to be a company that is authorized by regulatory agencies, e.g., in the United States, or otherwise, e.g., outside the United States, to operate a telecommunications system, i.e., provide telecommunications service(s). A telecommunications service provider ("TSP") is a type of communications service provider ("CSP") that has traditionally provided telephone and similar services. The term TSP generally excludes Internet service providers ("ISPs"), cable companies, satellite TV, and managed service providers.

For purposes of the present application a telecommunications carrier, otherwise known as a telecommunications service provider (TSP), may include aspects of the functionalities provided by a CSP and/or act in cooperation with such a CSP to deliver data, information, media, services or other functionalities of the disclosed subject matter. Outside the United States any entity(ies) that alone, or in cooperation with another, provide(s) such services as are noted herein to be provided by a telecommunications service provider or portion of a telecommunications service provider shall be considered to be within the meaning of telecommunications service provider for purposes of this application.

According to aspects of embodiments of the disclosed subject matter a telecommunications carrier or TSP may utilize a telecommunications connection provider to provide such equipment and services, including hardware and software, telecommunications lines and switches, customer equipment and the like, so as to provide the telecommunications and like service(s) noted in the present application. The telecommunications carrier or TSP may include or utilize the services of a telecommunications connection provider to, e.g., initiate, control, instantiate and disengage the necessary communication connections used in the consumption of telecommunications service(s). The telecommunications connection provider may employ one or more computing devices, such as a connection provider server. The connection provider server may be configured, e.g., on a packet switched network or other communications network, to provide telephone connections between callers (service customers) and callees (service customers), e.g., callers and merchants. In such an event the connection provider server can receive and/or place telephone calls via a telecommunication carrier/service provider, of which the connection provider server may be a part.

The connection provider server can route a call, e.g., originating through a packet switched network to a variety of destinations (e.g., a traditional analog telephone set, a mobile phone, a cellular phone, a WiFi phone, a Bluetooth phone, a softphone running on a computer, etc.). In doing so, e.g., the connection provider sever can use one or more forms of communication connection with the telephone carrier to facilitate the communication connections with a variety of devices used by the customer end users (e.g., callers and callees). The connection provider server can also be configured to place and/or receive direct VoIP calls to/from the caller or callee. The connection provider server can place separate VoIP calls, e.g., via the telecommunication carrier, i.e., one to the caller and one to the callee. This could be in response, e.g., to the caller clicking on a click-to-call button with the destination of the click-to-call request being the callee.

If the caller and/or the callee is on a public switched telephone network ("PSTN"), the telecommunication connection provider server can bridge the packet switched network and the public switched telephone network (PSTN). The telecommunication carrier/service provider, utilizing the connection provider server, can route the call from the packet switched network from/to the caller or the callee on the circuit switched network. The caller or the callee can use a telephone set to make/receive the call via a Plain Old Telephone Service ("POTS"). The connection provider server can join the separate calls that are placed via on the one hand the packet switched network and on the other hand on or to the public switched telephone network, in order to connect the caller and the callee.

The connection provider server may further include a database and/or a database server to store records related to the calls, data mapping between the communication references assigned to the callees and the actual phone numbers of the callees, etc. In one embodiment, contact mapping may be cached in local memory (e.g., RAM) of the appropriate computing device, i.e., the appropriate server(s) for improved performance. The cached mapping can be updated when the database is updated. The database and/or the connection provider server may include or be coupled to a listing directory database. The listing directory database may contain listings of subscriber advertisers and information about the advertisers, including specific advertisements associated with the subscriber (e.g., a merchant).

As used in the present application a communications device may be considered to be any one of a number of consumer-controlled and operated communications devices such as a plain old telephone system ("POTS") telephone handset, a cordless phone, a personal mobile communications device, such as a cell phone or other wireless communication device, a personal computer, laptop, video game console, smartphone, such as, a Blackberry™ or Droid™, personal digital assistant ("PDA"), or digital audio/video capable player, such as an MP3 player, an iPod™ or iPad™, a tablet or the like.

Such a communication device, as just indicated, may be embodied in an immobile device (e.g., a POTS wireline phone), a personal computer, such as a desktop, laptop or desk-side computer. A communication device can also include short range communications technology (e.g., a cordless phone) to support mobility within a small area such as the end user's residence. Alternatively, the communication device can be in the form of a personal communications mobile device, e.g., utilizing a wireless transceiver supporting long-range wireless communications. The wireless transceiver may utilize, as an example, technology for exchanging voice and data messages with wireless communications base stations, which can in turn relay such messages to targeted end user communication devices.

By way of example only, a wireline and/or wireless transceiver may utilize communications technology such as the plain old telephone system ("POTS"), WiFi, Bluetooth™, cordless or the like devices. WiFi for purposes of this application can be considered to be a mechanism for wirelessly connecting electronic devices. A device enabled with Wi-Fi, such as a personal computer, video game console, smartphone, or digital audio player or the like, can connect to the Internet via a wireless network access point, such as in an short range ad hoc wireless network. An access point (or hotspot) may, e.g., have a range of about 20 meters (65 feet) indoors and a greater range outdoors. Multiple overlapping access points can cover larger areas.

A communication device can be integrated, such as a multimode communication device ("MCD"). That is, e.g., when the MCD is within the premises of a building, it can be designed to function as a POTS wireline device or a VoIP device over a WiFi connection or a Bluetooth™ connection, or as a cordless phone. When roaming outside of a building, such an MCD can function as a wireless personal mobile communication device, e.g., operating on a cellular telephone network.

Any of such communications devices which is capable of accessing the Internet, or like digital communications network-based functionalities, is considered for the purposes of the present application as an Internet connectivity capable communications device. An Internet connectivity capable communications device may have a user interface, usually voice and graphics capable, e.g., in the form of a web page rendered in a web browser of a user device, such as a computer, a notebook, a PDA, a web terminal, etc. Such a web page may be downloadable, e.g., from a server that is connected to or a part of a telecommunications connection provider server. Alternatively, the user interface can be based on a technical standard for accessing information over a mobile wireless network, such as, a wireless application protocol ("WAP"), as an example, a WAP application on a wireless mobile device, such as a cellular phone.

According to some applications a voice portal may be used as part of the interface to an Internet connectivity capable communications device user. The voice portal can use an Interactive Voice Response (IVR) system to interact with the communications device user. For example, an IVR system may use voice-recognition or keypad input to receive user input. User Internet connection capable communications devices may be mobile devices, such as a PDA, a cellular phone, etc. and can obtain content information, e.g., through wireless communication connections, such as cellular communication links, wireless access points for wireless local area networks, etc. A user Internet connectivity capable communication device (e.g., a cellular phone, a computer, a PDA) also can receive content information from multiple types of media channels (e.g., a web server, a WAP server, a short message service center ("SMSC") server, a communications connection provider server, etc.).

According to aspects of embodiments of the disclosed subject matter, merchants can more effectively and efficiently distribute information to customers calling in to the merchant utilizing Internet connectivity capable communication devices. The disclosed subject matter relates to an Internet connectivity capable communications device, such as a cell phone, being used by a user, which user is a subscriber with a telephonic communication service provider for a merchant information distribution service. When the caller is dialing a business/merchant that the service provider has information concerning, e.g., stored in a listings directory database, such as by way of example only, a telephone listing directory database, and before the user engages the call button, a so-called data dip occurs by the telephonic communication connection provider server handling the call.

The data dip can be, e.g., into a telephonic communication listing directory database. The user making the call to the merchant can then be provided with information about the business of the merchant. After the call button is pushed but before the connection actually is made, more information can be provided to the user/caller. Still after the call is completed information may be provided. By way of an example, before, during or after the call being made, where the called party is not listed in the directory, but is close to and in the same business as an entity that is listed in the listing directory, information about that business listed in the directory may be provided to the caller. Information may continue to be provided even after the call is competed and the caller disconnected from the callee.

The information may be communicated to the user making the call, e.g., through the graphical display on the user's communication device, supplemented perhaps by audio tones, e.g., to prompt the user to look at the display for an information-containing message. According to aspects of embodiments of the disclosed subject matter data comprising information about the merchant may be provided to a user, e.g., along with a voice dialer application, or other methods and apparatus for making connections for voice phone calls on a user's telephone, e.g., while the parties are currently on a call.

A merchant can effectively place a business card, or like advertisement, including graphical and audio information, on top of the call being connected or already connected. The information can appear, e.g., on a screen display of the communication device before, during or after the call to the merchant. Real time targeted information about the business, and also focused in ways to the specific caller, can be transmitted to the caller by the connection provider server. As an example, where the callee merchant is a restaurant the caller may be provided with any or all of a menu, specials for the day, a streamed and saveable/printable discount coupon or directions to the restaurant.

Other information that may be provided, regardless of the nature of the business of the merchant, may be information in the form of reviews by others of the business, available products/services from the business, promotions in addition to coupons, alternate businesses of the same type within some given range of the location of the business being called or the caller or both. The receipt of the information may be made interactive utilizing, e.g., the display and audio, e.g., involving IVR. Simultaneous interaction with the merchant may be provided, e.g., for pre-ordering with the menu on the graphical display or received through the use of the IVR. Another visual interface with the merchant may be utilized, e.g., through the connection provider server and the user communications device. An example may be through the use of a connection to a merchant web-site.

In use, the system and method according to aspects of the disclosed subject matter, when the user dials a call to a callee merchant, there can be up to about an 8 second silent period before the call button is selected by the user. During this time period data information can be sent to the calling user, and viewed on the graphical display before the call is connected. The available time may depend on the speed with which the callee communications reference number is entered, the time before the communications connection provider server recognizes the communications reference from the directory database and the hesitation of the caller in engaging the call button. Additionally there can be ten seconds or so ordinarily before the called party answers the call, i.e., prior to picking up the phone and placing it to the called party's ear.

In operation, according to aspects of embodiments of the disclosed subject matter, prior to the caller engaging the call function button on the caller's communication device, and based on at least a portion of the telephone number for a callee merchant being entered, the communication device of the user can make another call, e.g., through the Internet. This other call as an example may connect the user's communication device to a merchant information distribution server and associated merchant information database. It will be understood by those skilled in the art that this additional call may be made at other times, e.g., based on other events of which the connection provider server and/or the merchant information distribution server becomes or can become aware. These may include, e.g., connection being made to the callee/merchant, the callee/merchant line being busy, the disconnection or imminent disconnection of the call to the callee/merchant, etc. The merchant information distribution server may search the merchant information database, or have already so searched the merchant information database, and provide information, such as is noted above, pertinent to the merchant. The information may be focused to information known about the caller, e.g., through a user profile, a user history of purchases with the particular merchant, a user location at present, etc.

The application running on the user's communication device may run on top of the calling initiation and maintaining functionality of the communication device and connection provider server interaction. The system can make a reverse call and look up the merchant calling reference, e.g., to retrieve available information about that merchant. The application can provide the information to the caller received from the merchant information server over the top of displays ordinarily related to making and/or engaging in the phone call by the user from the caller's communication device.

Aspects of the disclosed subject matter can relate to enhancements to a call voice dialer functionality found, e.g., on Bluetooth devices and the like. As an example, in operation, the system and method of the present application can vocally ask the user for an entity or number to call. In response to that input vocally returned from the user, but before the communication device voice dialer functionality verifies the intended recipient, and then attempts to place the actual call, the system and method of the present application can anticipate the call to the callee/merchant and respond as noted above. That is, the system and method can, e.g., make the separate call to the merchant information distribution server and have the appropriate information about the callee/merchant transmitted to the communications device of the user.

By way of further example, the system and method of the present application can involve callee/merchant involvement in the information provided. This may come in the form of the merchant having pre-selected certain information to be provided and had that stored in the listing directory database. Alternatively, the merchant may have provided the merchant information distribution server and/or database with certain business rules for providing specified information. This may be specified, e.g., by time and day of the week, and season, or the like, when the call is made by the caller. In other embodiments the information may be chosen from rules criteria that are specific to a given caller, such as current location and the like.

The system may further actually place a separate call to the merchant or a computing device of the merchant or an agent of the merchant to obtain instructions on what information to provide to the caller. As an example, the merchant's own voice dialer functionality may be utilized to obtain such merchant real time input. Thus, the merchant information distribution server can act as a back end controller of the information distribution system selecting what information to deliver and how to deliver it, including dynamically and in real time, based on business rules and real time information available to the merchant information distribution server, either from the merchant information distribution server/database or the merchant itself.

According to aspects of embodiments of the disclosed subject matter of the present application the connection provider server can engage in intuitive learning processes. As an example, over time, the system may learn information relating to, e.g., the caller and the called party merchant. As an example, the connection provider server logic may intuitively learn over time that the caller has just recently made a number of telephone calls to insurance carriers. The system and method may then send predictive data information related to insurance carriers, such as other participating listing subscriber insurance carrier recommendations. The other recommendations may be to a directory subscriber(s), where one or more of the prior called insurance carriers did not have directory listing subscription.

Over time the system and method may come to learn that the caller has not reacted positively to provided merchant information for a given merchant and so not to make the data dip call when the callee is that merchant. Similarly the system and method may learn that the caller has just recently called a particular called party and there would be no reason to pull pertinent data obtained by a new data dip for that called entity just yet. Call logs may be maintained by the connection provider server and utilized for purposes of this type of learning. To this end, as an example, the current system and method may save information after the call on the phone and/or in the network, such as in the merchant information distribution server and/or database.

Turning now to FIG. 1 there is shown schematically and in partly block diagram form a communications system 10 useful in employing the system and methods of the disclosed subject matter. The connection provider server 80, merchant information distribution server (not shown) and merchant server 50 may cooperate with each other in supporting and/or performing the functionalities of the system and method according to aspects of the disclosed subject matter. The connection provider server 80, merchant information distribution server (not shown) and merchant server 50 may be part or coupled to or otherwise cooperate with other servers and/or databases. As an example, the provider server 80, merchant information distribution server (not shown) and merchant server 50 may provide to and/or share with a social network database (not shown), such as for Facebook®, or Twitter® or the like. The information sharing may be utilized to publicize that the social network member is participating in an information distribution system and method as disclosed in the present application, e.g., by notification of "friends" and "friends of friends" on the social network. Likewise, the social network information may be utilized to focus on attributes of the caller, e.g., to meet criteria, e.g., under business rules being used by the system and method of the present application to present information to the user that is targeted to the particular user, the particular merchant, other particulars of the situation, etc.

According to aspects of embodiments of the presently disclosed subject matter, the information delivered may be utilized by the merchant or by the connection service provider to drive activity by the caller. As an example, in addition to providing promotions on behalf of the merchant, the system and method may seek to incentivize the caller to initially activate a merchant information subscription. For example, a call to a merchant may be perceived by the connection provider server 80 and it may link to another location, e.g., the merchant information distribution server (not shown) operating on the back end, to deliver an application to the caller to sign up for the merchant information distribution system. The caller may similarly be incented to activate an existing subscription merchant information distribution system application on the user's phone.

Merchants in the listing directory database and others may be enabled to vie for space in the merchant information distribution system, i.e., to have advertisements delivered by the merchant information distribution system, such as, through biddable advertisement bidding queues, as is known in the art. There may be many people vying for this space on a popularity of the advertisement bases or otherwise, e.g., based on how much the service provider can charge the advertiser for the merchant information distribution server to deliver a given advertisement. The system and method may, e.g., deliver the caller user subscription application as selected by a user, e.g., in an advertisement presented by the merchant information distribution server. Such an advertisement, as an alternative, may be embedded into the caller user's system, such as in one or more of the caller's contacts, calendar, and like functions, and capture the moment when a particular call ends and reach the caller user after the call.

Turning again to FIG. 1, it can be seen that system 10 may include a merchant server 20, which may be connected to a point of sale interface 22, e.g., a terminal at the establishment of the merchant used for payment for purchases by customers of goods or services, e.g., through a consumer payment system payment device, such as a credit card. The merchant server 20 may also be connected to a merchant database 24. The merchant database 24 may be used by the merchant to store and manipulate data relating to purchases by customers of goods or services, e.g., relating to interfacing with the remainder of the merchant information distribution system 10 and other related functionalities, such as, for the merchant to manage inventory, stocking, tax related matters and the like.

As part of the system 10 according to aspects of embodiments of the disclosed subject matter, customers may interface with the merchant server 20 and/or the point of sale interface 22 through the use of customer mobile communication devices, such as a customer cell phones 30 or 30' for respective customers. The cell phones 30, 30', or the like, may be Internet connectivity capable and communicate with the merchant or otherwise connect to the merchant over the Internet. The phones 30, 30' may each respectively be utilizing functionality(ies) embodied in respective mobile communications device applications 32, 32,' which can include the merchant information distribution subscriber service discussed in the present application.

The cell phones 30, 30', whether smart phones or not, may be in wireless connection to a part of the telephone carrier service e.g., through a cell telephone grid 40 and a respective cell telephone base station tower 42 within the grid. A second cell telephone grid 40' may be being utilized by one of the respective customer mobile communication devices, such as cell phones 30, 30' or by the merchant, e.g., through the merchant server 20 or other merchant telecommunications device (not shown).

The merchant server 20 or other telephonically capable merchant communications device (not shown) may be connected to a telephone service provider connection provider server 80, e.g., through the Internet 60. This may occur, as an example, through a gateway 50 on the merchant end and a gateway 52 on the connection provider server 80 end. The merchant server 20 may also be in telephonic communication with the connection provider server 80 through a switch-based telephone network 72, as an example through a standard ground line or wired line handset 70 as part of the merchant customer equipment, and which may, e.g., be embedded in the merchant server 20 and/or in the point of sale interface 22.

The connection provider server 80 may be connected to a database 82, which may include as at least a portion of the connection provider database 82, a directory listings database. The directory listings database may include listings of merchant subscribers to the listing service and, therefore, various kinds of information associated with such listings. The information may include a communication reference(s) for the listing, information about the merchant subscriber, promotions offered by the merchant, products and/or services offered by the merchant, the merchant's location and directions, etc.

Figure 2:
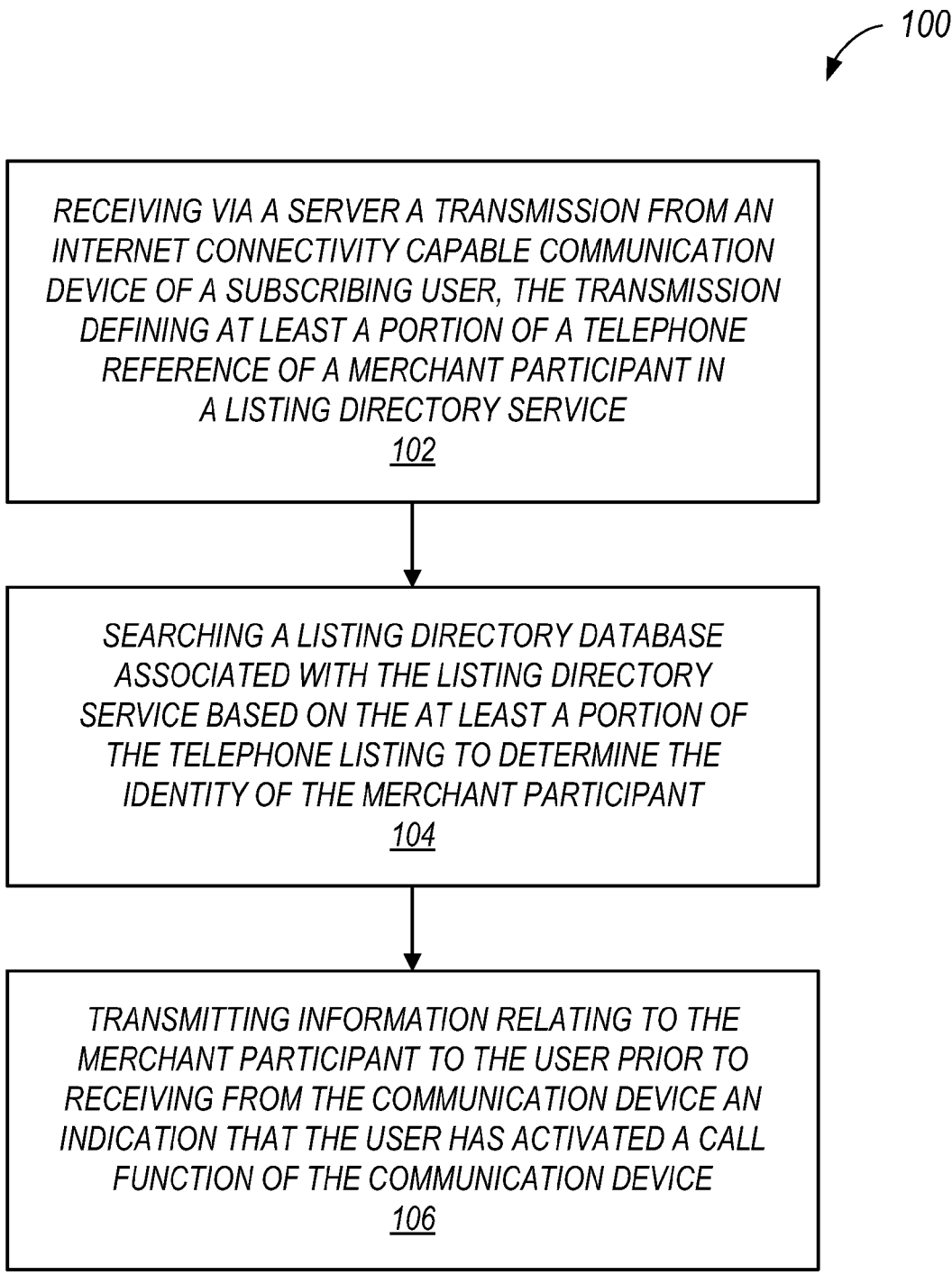
FIG. 2 shows a block diagram illustration of a method according to aspects of embodiments of the disclosed subject matter.

Turning now to FIG. 2 there is shown in block diagram form a flow 100 of a merchant information distribution system 10 and method according to a process 100 according to aspects of embodiments of the disclosed subject matter. The process 100 can involve, e.g., in block 102 the process of receiving via a server a transmission from an Internet connectivity capable communication device of a subscribing user, the transmission defining at least a portion of a telephone reference of a merchant participant in a listing directory service. In block 104 can be performed the process of searching a listing directory database associated with the listing directory service based on the at least a portion of the telephone listing to determine the identity of the merchant participant. In block 106 the process of transmitting information relating to the merchant participant to the user prior to receiving from the communication device an indication that the user has activated a call function of the communication device can be performed.

Certain aspects of the disclosed subject matter may be considered to be similar to existing services, e.g., directory assistance information calling functionalities, where the telecommunications service provider can return information about the called party. However, a significant difference here is that in such systems information is static and pre-loaded into the directory assistance database and there is no 2-way interaction with the information. Here, the information returned may be made specific to information known by or obtained by the merchant information distribution server, e.g., about the current caller and the callee merchant. That is, the identification of the caller and past interactions with the merchant information distribution server 80 and/or the directory server (not shown) and/or the merchant server 20 regarding the same merchant or similar merchants.

Other factors which may be considered can include, e.g., the current location of the caller, and other real-time information to focus the information provided. In addition, for the user of the graphics and audio capabilities of the user communications device, the provision of information in real time can be interactive in real time as well. Another difference with such as a directory assistance information system is that there the user is seeking a connection to the merchant through obtaining the merchant's communication connection reference. Here the system and method determines the intended callee merchant from the entry of a callee communication reference or a part thereof, before the call button is pressed, and provides the caller information accordingly.

In addition, as noted herein, the information may be continued to be provided in the same focused and real time fashion, during the call, e.g., using a smart phone through the dialer function. In addition, unlike a directory assistance information system, information may be provided to either or both of the caller and callee merchant before, during or after the call to the callee merchant. The system and method of the present application may provide information regarding several different merchants or filtered from information made available by different merchants. As an example, the system and method may search the directory database by some category, e.g., merchants of a given type in proximity to the caller, merchants of a given type with outstanding coupon offers, and the like.

As another example, unlike a directory assistance information system after the call is completed, the system can send information about the business of the merchant or the business of competing merchants. In addition, there is no capability in a system such as a directory assistance information system to further deliver relevant merchant information to the caller even during the call. In this regard, during the call, the system can also provide the user with a distinctive tone to alert the user to look back at the screen to see what just popped up on the screen.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least emulate a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/pre-programmed instructions, and/or followed instructions found in hard-wired or customized circuitry to carry out logic operations that, together, perform processes of and whole processes and functionalities as described in the present disclosure.

In this description, various functions, functionalities and/or operations may be described as being performed by or caused by software program code to simplify description. However, those skilled in the art will recognize what is meant by such expressions is that the functions resulting from execution of the program code/instructions are performed by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metallization(s) interconnects of the base gate array ASIC architecture or selecting and providing metallization(s) interconnects between standard cell functional blocks included in a manufacturers library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operations to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc. In one embodiment, a user terminal can be a computing device, such as a in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product, in a variety of forms and are capable of being applied regardless of the particular type of computing device machine or computer-readable media used to actually effect the distribution.

The disclosed subject matter is described with reference to block diagrams and operational illustrations of methods and devices to provide a system and methods according to the disclosed subject matter. It is understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, which executed by the computing device, e.g., on a processor within the computing device or other data processing apparatus, such that, when so executed, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented therein. Alternative embodiments are contemplated in which the order of the various functions, functionalities and operations may be altered and in which sub-operations described as being part of a larger operation may be performed independently or performed differently than illustrated or not performed at all.

Although some of the drawings illustrate a number of operations in a particular order, functions, functionalities and/or operations which are not now known to be order dependent or become understood to not be order dependent may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

The disclosed subject matter is described in the present application with reference to one or more specific exemplary embodiments thereof. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense.

We claim:

1. A method comprising:
   receiving, via a server, a transmission from a communication device that is an Internet connectivity capable communication device of a subscribing user, the transmission defining at least a portion of a telephone reference of a merchant participant in a listing directory service;
   searching a listing directory database associated with the listing directory service based on the at least a portion of the telephone reference to determine an identity of the merchant participant; and
   transmitting, via the server, information relating to the merchant participant to the communication device prior to receiving from the communication device an indication that the user has activated a call function of the communication device, wherein the information relating to the merchant participant is to be displayed on a dialer display of the communication device.

2. The method of claim 1 further comprising:
   the information comprising directions to the merchant participant.

3. The method of claim 1 further comprising:
   the information comprising a definition of at least one of a good and/or a service provided by the merchant participant.

4. The method of claim 1 further comprising:
   an application running on the communication device controlling the transmission from the communication device.

5. The method of claim 4 further comprising:
   directing the transmission to a merchant information distribution server connected to the listing directory database.

6. The method of claim 4 further comprising:
   the transmission including an instruction to a merchant information distribution server, to phone the communication device, during a communication between the user and the merchant participant, to provide to the user, additional information related to the merchant participant.

7. The method of claim 4 further comprising:
   the transmission including an instruction to the merchant information distribution server to phone the user communication device after a communication between the user and the merchant participant to provide additional information related to the merchant participant to the user.

8. The method of claim 1 further comprising:
   receiving the transmission, via Internet connection with the communication device.

9. A non-transitory machine readable medium storing a set of instructions that, when executed by a computing device, causes the computing device to perform a method, the method comprising:
   receiving a transmission from a communication device that is an Internet connectivity capable communication device of a subscribing user, the transmission defining at least a portion of a telephone reference of a merchant participant in a listing directory service;
   searching a listing directory database associated with the listing directory service based on the at least a portion of the telephone reference to determine an identity of the merchant participant; and
   transmitting information relating to the merchant participant to the communication device prior to receiving from the communication device an indication that the user has activated a call function of the communication device, wherein the information relating to the merchant participant is to be displayed on a dialer display of the communication device.

10. The machine readable medium of claim 9, the method further comprising:
    the information comprising directions to the merchant participant.

11. The machine readable medium of claim 9, the method further comprising:
    the information comprising a definition of at least one of a good and/or a service provided by the merchant participant.

12. The machine readable medium of claim 9, the method further comprising:
    an application running on the communication device controlling the transmission from the communication device.

13. The machine readable medium of claim 12, the method further comprising:
    directing the transmission to a merchant information distribution server connected to the listing directory database.

14. The machine readable medium of claim 12, the method further comprising:
    the transmission including an instruction to a merchant information distribution server, to phone the communication device, during a communication between the user and the merchant participant, to provide to the user, additional information related to the merchant participant.

15. The machine readable medium of claim 12, the method further comprising:
    the transmission including an instruction to a merchant information distribution server to phone the user communication device after a communication between the user and the merchant participant to provide additional information related to the merchant participant to the user.

16. The machine readable medium of claim 9, the method further comprising:

receiving the transmission, via Internet connection with the communication device.

17. A system comprising:

a computing device configured to: receive a transmission from a communication device that is an Internet connectivity capable communication device of a subscribing user, the transmission defining at least a portion of a telephone reference of a merchant participant in a listing directory service;

search a listing directory database associated with the listing directory service based on the at least a portion of the telephone reference to determine an identity of the merchant participant; and transmit information relating to the merchant participant to the communication device prior to receiving from the communication device an indication that the user has activated a call function of the communication device, wherein the information relating to the merchant participant is to be displayed on a dialer display of the communication device.

18. The system of claim 17 further comprising:

the information comprising directions to the merchant participant.

19. The system of claim 17 further comprising:

the information comprising a definition of at least one of a good and/or a service provided by the merchant participant.

20. The system of claim 17 further comprising:

an application running on the communication device controlling the transmission from the communication device.

\* \* \* \* \*